3,162,680
1-(5-GLUTAMYL)-2-(PHENYL)-LOWER ALKYL HYDRAZINES
John H. Biel, Milwaukee, Wis., assignor, by mesne assignments, to Colgate-Palmolive Company, a corporation of Delaware
No Drawing. Filed Dec. 19, 1958, Ser. No. 781,422
4 Claims. (Cl. 260—518)

This invention relates to hydrazine derivatives. More particularly, this invention is concerned with 1-phenylalkyl-2-acyl hydrazines and the use of these compounds as psychotherapeutic agents. The invention is also concerned with novel pharmaceutical compositions containing a 1-phenylalkyl-2-acyl hydrazine.

This application is a continuation-in-part of my copending application Serial No. 716,878, filed February 24, 1958, now abandoned.

It has now been discovered according to the present invention that 1-phenylalkyl-2-acyl hydrazines of the formula

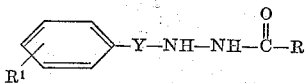

wherein Y is an alkylene group,

is an acyl group, and $R^1$ is hydrogen or a nuclear substituent, are potent monoamine oxidase inhibitors and central nervous system stimulants useful for psychotherapeutic treatment of depressed mental states.

Although I do not wish to be restricted to a theory, it is considered that the 1-phenylalkyl-2-acyl hydrazines pass through the blood-brain barrier and, because of their monoamine oxidase inhibitory property, retard or prevent the metabolic destruction of neurohumoral agents such as serotonin and norepinephrine. Serotonin and norepinephrine are present in the brain and apparently serve as chemical transmitters in, or stimulants of, the central nervous system. A deficiency of available serotonin or norepinephrine in the brain, such as can be caused by metabolism or degradation of these agents by monoamine oxidase, may result in parasympathetic predominance present in depressed mental states. By preventing or retarding destruction of serotonin and norepinephrine through the use of 1-phenylalkyl-2-acyl hydrazines the levels of these neurohumoral agents present in the body are maintained higher for longer periods of time so that sympathetic characteristics such as increased awareness and motility result.

Representative of some of the 1-phenylalkyl-2-acyl hydrazines of the formula

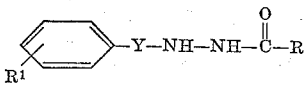

which have the described psychotherapeutic activities, advisably as nontoxic acid addition salts, are compounds in which Y, R and $R^1$ have the following significance:

(1) Y is a straight or branched alkylene group, advisably of 12 or less carbons although it generally is of 5 or less carbons, such as of the group:
   (a) $CH_2$, methylene
   (b) $CH(CH_3)$, 1-methylmethylene
   (c) $CH(CH_3)CH_2$, 1-methylethylene
   (d) $CH_2CH_2CH_2$, propylene
   (e) $CH_2CH(CH_3)$, 2-methylethylene
   (f) $CH(CH_3)CH_2CH_2$, 1-methylpropylene
   (g) $CH_2CH(CH_3)CH_2$, 2-methylpropylene
   (h) $CH_2CH_2CH(CH_3)$, 3-methylpropylene
   (i) $CH_2CH_2CH(CH_3)CH_2$, 3-methylbutylene (2) R is hydrogen or a substituent of the group consisting of:
   (a) Alkyl groups from 1 to 15 carbons and advisably lower alkyl groups such as methyl, ethyl, propyl, butyl, isopropyl and the like.
   (b) Aryl groups such as the phenyl group and nuclear substituted phenyl groups such as halophenyl, alkoxyphenyl, hydroxyphenyl, o-acyloxyphenyl, aminophenyl, acetylaminophenyl, di- and trialkoxyphenyl groups and lower alkylenedioxyphenyl groups and especially the 3,4-methylenedioxyphenyl, o-acetoxyphenyl, dimethoxyphenyl, p - aminophenyl, p - acetylaminophenyl, 3,4,5-trimethoxyphenyl, dimethoxyphenyl, p-chlorophenyl, p-hydroxyphenyl, p-methoxyphenyl and o-methylphenyl groups.
   (c) Aralkyl groups such as phenyl-lower alkyl groups including the benzyl, phenethyl, phenylisopropyl, phenylbutyl, o-methylbenzyl, 2-propenylphenyl, 2-phenyl-1-aminoethyl, 2-(3,4-dihydroxyphenyl)-1-aminoethyl, 3-phenyl-2-amino-2-propyl $$[\phi CH_2C-(CH_3)-]$$
$$\underset{NH_2}{|}$$

2-(3,4 - methylenedioxyphenyl) - 1 - aminoethyl, and 1-phenyl-2-hydroxyethyl groups.
   (d) Cycloalkyl groups such as the cyclopentyl and cyclohexyl groups.
   (e) Heterocyclic groups such as the pyridyl, quinolyl, cinchonyl, 4-pyridyl, 3-pyridyl, thiazolyl, thienyl, 3-indolyl, 2-indolyl, 5-hydroxy-3-indolyl, 5-methoxy-1-benzyl-3-indolyl, 1 - benzyl-2,5-dimethoxy-3-indolyl, isoxazolyl, imidazolyl, 2-(3-indolyl)-1-amino-ethyl, 5-keto-2-pyrrolidinyl, 5-pyrrolidyl and 1-methyl-4-phenyl-4-piperidyl groups.
   (f) Aralkenyl groups such as the phenylethenyl group.
   (g) Hydroxyalkyl groups such as the hydroxymethyl and hydroxyethyl groups.
   (h) Cycloalkyl-lower alkyl groups such as the cyclopentylpropyl and cyclohexylmethyl groups.
   (i) Alkynyl groups and particularly lower alkynyl groups such as the propargyl group.
   (k) Groups in which

represents a dicyclic glycolyl group including the benziloyl, phenylcyclohexyl glycolyl, phenylcyclopentyl glycolyl, 2-thienyl phenyl glycolyl and dicyclohexyl glycolyl groups.
   (l) Aminoalkyl groups such as aminomethyl, β-aminoethyl, alpha-aminoethyl, 3-(methylmercapto)-1-aminopropyl, 4-methyl-1-aminobutyl, 3-hydroxy-1-aminopropyl and 3-methyl-3-hydroxy-1-aminopropyl.
(m) Omega-carboxy-(amino)-alkyl groups such as 2-carboxy-1-aminoethyl, 3-carboxy-1-aminopropyl, and 3-carboxy-3-amino-1-propyl.
(n) Carboxyalkyl groups such as the carboxy-lower alkyl groups including the carboxyethyl group.
(3) $R^1$ is hydrogen or at least one nuclear substituent on the phenyl group such as a:
(a) Lower alkyl group such as methyl, ethyl, propyl and the like.
(b) Lower alkoxy group such as methoxy, ethoxy, and the like.
(c) Halogen such as bromine or chlorine.
(d) The hydroxy group.
(e) A lower alkylenedioxy group such as the 3,4-methylene dioxy group.
(f) Aryl group such as the phenyl group.
(g) Aryloxy group such as the phenoxy group.
(h) Aralkyl group as the benzyl or phenethyl group.

Some specific compounds which may be used as described are 1-phenylmethyl-2-acetyl hydrazine, 1-phenylethyl-2-propionyl hydrazine, 1-phenylpropyl-2-benzoyl hydrazine, 1-phenylisopropyl-2-cyclohexanecarboxyl hydrazine, 1-p-chlorophenylmethyl-2-phenylacetyl hydrazine, 1-p-methoxyphenylhexyl-2-p-chlorophenylpropionyl hydrazine, 1-phenylisopropyl-2-isonicotinyl hydrazine, 1-phenylbutyl-2-(2-pyrrolecarboxyl)hydrazine, 1 - phenyloctyl - 2-nicotinyl hydrazine, 1-phenylethyl-2-(2-pyrazinylcarboxyl) hydrazine, 1-o-methylphenylisopropyl-2-cinnamoyl hydrazine, 1 - phenylisopropyl-2-hydroxyacetyl hydrazine, 1-phenylethyl-2-cyclohexylacetyl hydrazine, 1-phenylmethyl-2-acrylyl hydrazine, 1-phenylisopropyl-2-benziloyl hydrazine, 1-phenylethyl-2-dicyclohexyl glycolyl hydrazine, 1-phenylpropyl-2-furanecarboxyl hydrazine, 1-benzilyl-2-phenylisopropyl hydrazine, 1-(5-pyrrolidone)-2′-carboxyl-2-benzyl hydrazine, 1-glutamyl-2-(alphaphenyl)-ethyl hydrazine, 1-benzoyl-2-phenylisopropyl hydrazine, N-(5-pyrrolidone-2-carboxyl)-N′-(1 - phenyl-2-propyl) hydrazine, N-(5-L-glutamyl)-N′-(1-phenyl-2-propyl) - hydrazine, 1-nicotinyl-2-phenylisopropyl hydrazine, 1-picolinyl-2- phenylisopropyl hydrazine and 1-palmitoyl-2-phenylisopropyl hydrazine.

The most potent monoamine oxidase inhibitors of Formula I are those in which Y has no more than three carbons between the phenyl and hydrazine moieties.

These 1-phenylalkyl-2-acyl hydrazines have an effect on the heart. The compounds are useful in the treatment of a person in a state of shock.

These compounds are hypotensor agents when administered to humans and thus are useful in the treatment of hypertension. In the dog, however, they raise the blood pressure.

Many of these compounds are many times more potent monoamine oxidase inhibitors than iproniazid. N-(5 - pyrrolidone-2-carboxyl) - N′-(1-phenyl-2-propyl)-hydrazine is particularly active and, in addition, is faster acting in humans than iproniazid.

The compounds of this invention are useful for potentiating other therapeutic agents, such as phenothiazine tranquilizers like promazine and chloropromazine.

When a 1-phenyl-2-acyl hydrazine is administered to an animal followed by a barbiturate, the sedative action of the barbiturate is potentiated.

The compounds of this invention are themselves potentiated by chlorothiazide so that a greater hypotensor activity is obtained.

These compounds are also useful in treating angina pectoris.

These compounds in general are neutral rather than basic compounds. If there is an additional group of a basic nature present such as the compound of Example 2 following nontoxic acid addition salt such as the hydrochloride, hydrobromide, phosphate, fumarate or sulfate may be readily prepared.

The 1-phenylalkyl-2-acyl hydrazines may be administered to animals and humans as pure compounds. It is advisable, however, to first combine one or more of the novel compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar talc and the like may be used to form powders. The powders may be used as such for direct administration to a patient or, instead, the powders may be added to suitable foods and liquids, including water, to facilitate administration.

The powders may also be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the 1-phenylalkyl-2-acyl hydrazines as a nontoxic acid addition salt and may be administered one or more at a time at regular intervals. Such unit dosage forms, however, should generally contain a concentration of 0.1% to 10% by weight of one or more of the active hydrazines.

Dosages of from about 1 mg. to 50 mg. may be administered to obtain the stated activities. However, the recommended dosages are from 3 to 12 mg. daily. Larger dosages may be administered on an interrupted schedule but generally not more than 50 mg. and preferably not more than 25 mg. is administered daily.

A typical tablet may have the composition:

| | Mg. |
|---|---|
| (1) 1-isonicotinyl-2-phenylisopropyl hydrazine HCl | 10 |
| (2) Starch, U.S.P. | 57 |
| (3) Lactose, U.S.P. | 73 |
| (4) Talc, U.S.P. | 9 |
| (5) Stearic acid | 6 |

Powders 1, 2 and 3 are slugged, then granulated, mixed with 4 and 5, and tableted.

Similarly, N-(5-pyrrolidone-2-carboxyl)-N′-(1-phenyl-2-propyl)-hydrazine may be used in this procedure to form tablets containing it as the active ingredient.

Capsules may be prepared by filling No. 3 hard gelatin capsules with the following ingredients, thoroughly mixed:

| | Mg. |
|---|---|
| (1) 1-acetyl-2-phenylethyl hydrazine HCl | 5 |
| (2) Lactose, U.S.P. | 200 |
| (3) Starch, U.S.P. | 16 |
| (4) Talc, U.S.P. | 8 |

The oral route is preferred for administering the active 1-phenylalkyl-2-acyl hydrazines.

According to a further embodiment of this invention one or more of the 1-phenylalkyl-2-acyl hydrazines is administered simultaneously with, or concomitantly to, the administration of either tryptophan and/or phenylalanine to an animal or human. Tryptophan passes the blood-brain barrier and is converted in the brain to serotonin. Serotonin is not administered directly since it cannot pass the blood-brain barrier. Similarly, phenylalanine passes the blood-brain barrier and is converted in the brain to norepinephrine. Norepinephrine itself will not pass the blood-brain barrier so it is not given directly. By the administration of an active 1-phenylalkyl-2-acyl hydrazine simultaneously with, or concomitantly to, either tryptophan or phenylalanine the monoamine oxadase inhibitory property of the hydrazine retards or prevents the degradation of serotonin and/or norepinephrine which are produced in the brain from the said amino acids. The serotonin and norepinephrine levels are thus not only raised but are maintained at the increased level by the described treatment.

Any suitable amounts of tryptophan and/or phenylalanine may be administered since these materials are nontoxic. One or more of these materials advisably combined with one or more of the active hydrazines into suitable pharmaceutical formulations.

This method of preparing the 1-phenylalkyl-2-acyl hydrazines comprises reacting the hydrazine with a phenylalkyl ketone or aldehyde to form a 1-aralkylidenyl-2-acyl hydrazine and reducing the hydrazone to the desired 1-phenylalkyl-2-acyl hydrazines. This process may be represented as follows:

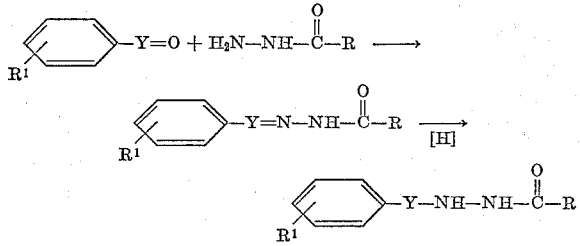

wherein Y, R and $R^1$ have the significance previously assigned.

Some of the phenylalkyl ketones or aldehydes which may be used in this process are phenylacetaldehyde, phenylpropionaldehyde, phenylbutyraldehyde, phenylacetal, phenylvaleraldehyde, phenylethanone, phenylacetone, 1,3-diphenyl-2-propanone, phenylpentanone and p-chlorophenylbutanone and similar compounds containing one or more nuclear groups on the phenyl group, such as represented by $R^1$ in the Formula I.

Representative of the acyl hydrazines which may be used in the process are acetyl hydrazine, propionyl hydrazine, benzoyl hydrazine, cyclohexanecarboxyl hydrazine, phenylacetyl hydrazine, isonicotinyl hydrazine, pyrrolcarboxyl hydrazine, nicotinyl hydrazine, benziloyl hydrazine, dicyclohexylglycolyl hydrazine and the like.

Reaction between the phenylalkyl ketone or aldehyde and the acyl hydrazine is conveniently effected by contacting the reactants in the presence of water or a lower alcohol. The reaction proceeds at room temperature although slightly elevated temperatures such as the reflux temperature may be employed to increase the rate of reaction.

Recovery of the intermediate aminoalkylidenyl hydrazine is conveniently effected by conventional methods. Thus, the product, generally an oil as the free base, may be salted out with an alkali metal hydroxide and extracted with a water immiscible organic solvent such as ether. The product is readily isolated by distillation under reduced pressure.

The intermediate hydrazones may be reduced to the corresponding hydrazines by use of a suitable reducing agent. Lithium aluminum hydride may be used although catalytic hydrogenation is recommended. With lithium aluminum hydride, the reduction may be conveniently effected by intimately combining the reactants in an inert organic solvent such as anhydrous ether, dioxane, or tetrahydrofuran. Elevated temperatures such as the reflux temperature enhance the reaction. At reflux temperature, from 1 to 8 hours is usually sufficient to substantially complete the reaction. After the reaction is terminated, water may be added to the mixture to decompose excess lithium aluminum hydride. To recover the product, the organic phase is separated and the aqueous residue extracted with the same solvent. The organic phase and extracts then may be combined, dried, and the product distilled.

Catalytic reduction is readily achieved using catalysts such as rhodium, platinum oxide, palladium and the like in solvents such as methanol, ethanol, tetrahydrofuran, water, ethyl acetate and dioxan. Raney nickel is not a particularly suitable catalyst since undue cleavage occurs. Hydrogen pressures of about 50 to 3000 p.s.i. may be used. The temperature of reduction may be room temperature of increased temperatures such as up to 80° C.

Hydrazines, such as those named above, may be formed in this way.

The following examples illustrate the methods of making the compounds.

EXAMPLE 1

*1-Isonicotinyl-2-Phenylisopropylidenyl-Hydrazine*

A mixture of 23.3 g. (0.17 mole) of isonicotinyl-hydrazine and 45.6 (0.34 mole) of phenylacetone in 200 cc. of isopropanol was refluxed for six hours. After removal of the isopropanol by distillation in vacuo, a solid residue remained which was recrystallized from isopropanol. White crystals were obtained, M.P. 112–114° C., yield, 31.0 (72%).

EXAMPLE 2

*1-Isonicotinyl-2-Phenylisopropyl Hydrazine and Hydrochloride*

A solution of 12.7 g. (0.05 mole) of 1-isonicotinyl-2-phenylisopropylidenyl hydrazine in 100 cc. of methanol was hydrogenated on the Parr apparatus at room temperature and initial pressure of 60 lbs., using 100 mg. of platinum oxide as catalyst. The reduction was stopped at the end of two hours, when one mole-equivalent of hydrogen was used. The catalyst was filtered off through a Celite bed, and the methanol was removed by distillation in vacuo. The syrupy residue was dissolved in 125 cc. of isopropanol, and ethereal HCl was added to pH 1.0 to 2.0. White crystals were obtained which were recrystallized by dissolving them in 400 cc. of methanol and adding 500 cc. of isopropanol; M.P. 239–240° C. dec., yield 14.0 g. (85%).

*Analysis.*—Calcd. for $C_{15}H_{19}Cl_2N_3O$: Cl, 21.60%; N, 12.80%. Found: Cl, 21.71%; N, 13.03%.

EXAMPLE 3

*1-Benziloyl-2-Phenylisopropylidenyl Hydrazine*

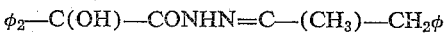

A mixture of 0.10 mole of benzilic acid hydrazide and 0.10 mole of phenylacetone in 200 cc. of tertiary butyl alcohol was refluxed for 4 hours, the solvent removed by distillation in vacuo. The residue contained this product.

EXAMPLE 4

*1-Benziloyl-2-Phenylisopropyl Hydrazine*

A solution containing 0.078 mole of the isopropylidene derivative of Example 3 in 150 cc. of methanol was subjected to hydrogenation with 150 mg. of platinum oxide at 60 lbs. of hydrogen. After the theoretical amount of hydrogen had been absorbed, the reaction was stopped, the catalyst removed by filtration and the product isolated as in Example 2. The hydrazide was a solid.

EXAMPLE 5

*1-(5-Pyrrolidone)-2'-Carboxyl-2-Benzylidenyl Hydrazine*

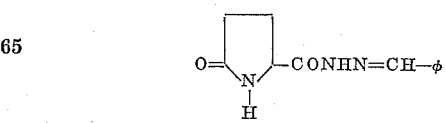

2-carbethoxy-5-pyrrolidone was converted to 5-pyrrolidone-2-carboxy hydrazide by refluxing the ester with a methanolic solution of hydrazine hydrate. The hydrazide was isolated in the usual manner and 0.10 mole of it reacted with 0.10 mole of benzaldehyde in methanol at reflux temperature for one hour. The methanol solution contained this product.

EXAMPLE 6

*1-[(5'-Pyrrolidone)-2'-Carboxyl]-2-Benzyl Hydrazine*

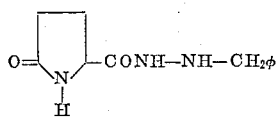

A methanol solution containing 0.10 mole of the benzylidene derivative of Example 5 was subjected to hydrogenation at 40 p.s.i. of hydrogen in the presence of 0.1 g. of platinum oxide catalyst. Hydrogenation was discontinued as soon as the theoretical amount of hydrogen had been absorbed, to prevent cleavage of the benzyl group. The catalyst was removed by filtration and the solvent removed by distillation. The residue was an oil which did not readily crystallize.

EXAMPLE 7

*1-(5-Glutamyl)-2-(Alpha-Phenyl)-Ethyl Hydrazine*

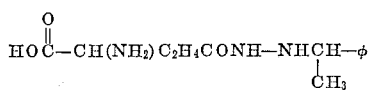

Ethyl glutamate was converted to the hydrazide in the usual manner. The hydrazide was reacted with acetophenone by mixing equimolar quantities of glutamic acid hydrazide with acetophenone in methylisobutylcarbinol and refluxing the mixture for several hours. The solvent was removed by distillation in vacuo and the residue taken up in methanol. The methanol solution was subjected to hydrogenation in the usual manner being careful, however, to allow only the theoretical amount of hydrogen to be absorbed. The hydrogenation catalyst was removed by filtration and the filtrate concentrated in vacuo. The residual product was a low melting solid.

EXAMPLE 8

*1-Benzoyl-2-Phenylisopropyl Hydrazine*

1-benzoyl hydrazine was reacted with 1-phenyl-2-propanone following the method of Example 1 and the resulting phenylisopropylidene derivative reduced catalytically as in Example 2 to yield the desired product.

EXAMPLE 9

*5-Pyrrolidone-2-Carboxylic Acid Hydrazide*

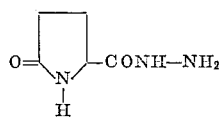

A mixture containing 15.6 g. (0.12 mole) of methyl 5-pyrrolidone-2-carboxylate, 10.3 g. of 85% hydrazine and 200 cc. of ethanol was refluxed for several hours, the ethanol removed by distillation and the residue crystallized from a mixture of ethanol-ethyl acetate, yield 14.2 g. (91%), M.P. 113–115° C.

EXAMPLE 10

*N-(5-Pyrrolidone-2-Carboxyl)-N'-(1-Phenyl-2-Propylidenyl)-Hydrazine*

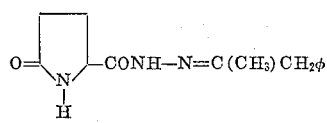

A mixture of 37 g. (0.26 mole) of the hydrazide from Example 9 and 67 g. (0.50 mole) of phenylacetone, 100 cc. of isopropanol and 75 cc. of ethanol was refluxed for 6 hours. The solvents were removed by distillation and the residue recrystallized from ethanol, yield 62 g. (92%); M.P. 153° C.

*Analysis.*—Calcd. for $C_{14}H_{17}N_2O_3$: N, 16.20. Found: N, 15.35.

EXAMPLE 11

*N-(5-Pyrrolidone-2-Carboxyl)-N'-(1-Phenyl-2-Propyl)-Hydrazine*

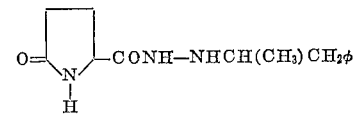

The acyl hydrazone (12.95 g.) of Example 10 was reduced with 0.50 g. of $PtO_2$ in 200 cc. of ethanol at 60 lbs. of hydrogen. The solvent was removed by distillation and the residue crystallized from ether. The solid was recrystallized from acetonitrile, M.P. 160° C.

*Analysis.*—Calcd. for $C_{14}H_{19}N_2O_3$: N, 16.08. Found: N, 15.95.

EXAMPLE 12

*N-(5-L-Glutamyl)-N'-(1-Phenyl-2-Propylidenyl)-Hydrazine*

To 16.1 g. (0.10 mole) of 5-1-glutamic acid hydrazide dissolved in 200 cc. of water at 35° C. was added 13.4 g. (0.10 mole) of phenylacetone and the mixture stirred for 3 hours. The white precipitate was collected by filtration, yield 20 g. (72%); M.P. 173° C.

*Analysis.*—Calcd. for $C_{14}H_{19}N_3O_3$: N, 15.15. Found: N, 14.90.

EXAMPLE 13

*N-(5-L-Glutamyl)-N'-(1-Phenyl-2-Propyl)-Hydrazine*

The compound of Example 12 was subjected to hydrogenation in the manner described in Example 11; yield 85%; M.P. 174–175° C.

*Analysis.*—Calcd. for $C_{14}H_{21}N_3O_3$: N, 15.05. Found: N, 15.35.

EXAMPLE 14

*1-Nicotinyl-2-Phenylisopropylidenyl Hydrazine*

This hydrazone was prepared from nicotinic acid hydrazide and 1-phenyl-2-propanone following the procedure in Example 1; M.P. 134–135° C.; yield 83%.

*Analysis.*—Calcd. for $C_{15}H_{15}N_2O_2$: N, 16.59. Found: N, 16.53.

EXAMPLE 15

*1-Nicotinyl-2-Phenylisopropyl Hydrazine*

The acyl hydrazone of Example 14 was reduced by the method shown in Example 2.

The dihydrochloride salt melted at 237–238° C.

*Analysis.*—Calcd. for $C_{15}H_{19}Cl_2N_3O$: Cl, 21.60; N, 12.80. Found: Cl, 21.43; N, 12.69.

EXAMPLE 16

*1-Picolinyl-2-Phenylisopropylidenyl Hydrazine*

This compound was prepared from picolinic acid hydrazide and 1-phenyl-2-propanone by the procedure of Example 1; yield 90%, M.P. 145–146° C.

*Analysis.*—Calcd. for $C_{15}H_{15}N_2O_2$: N, 16.59. Found: N, 16.20.

EXAMPLE 17

*1-Picolinyl-2-Phenylisopropyl Hydrazine*

The acyl hydrazone of Example 16 was reduced by the method outlined in Example 2.

The dihydrochloride salt melted at 189–190° C.

*Analysis.*—Calcd. for $C_{15}H_{19}Cl_2N_3O$: Cl, 21.60; N, 12.80. Found: Cl, 21.35; N, 12.60.

EXAMPLE 18

*1-Palmitoyl-2-Phenylisopropylidenyl Hydrazine*

This compound was prepared from palmitoic acid hydrazide and 1-phenyl-2-propanone by the procedure of Example 1, yield 90%, M.P. 75–76° C.

*Analysis.*—Calcd. for $C_{25}H_{39}N_2O$: N, 7.24. Found: N, 7.08.

EXAMPLE 19

*1-Palmitoyl-2-Phenylisopropyl Hydrazine*

The acyl hydrazone of Example 18 was reduced by the method outlined in Example 2; M.P. 81–82° C.

*Analysis.*—Calcd. for $C_{25}H_{41}N_2O$: N, 7.21. Found: N, 7.57.

Various changes and modifications of the invention can be made and, to the extent that such variations incorporate the spirit of this invention, they are intended to be included within the scope of the appended claims.

What is claimed is:

1. A compound of the formula

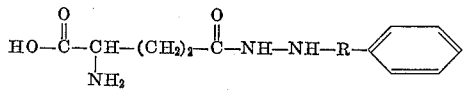

wherein R is a lower alkylene radical.

2. 1-(5-glutamyl)-2-(alpha-phenyl)-lower alkyl hydrazine.

3. 1-(5-glutamyl)-2-(alpha-phenyl)-ethyl hydrazine.

4. N-(5-L-glutamyl)-N'-(1-phenyl-2-propyl)-hydrazine.

References Cited in the file of this patent

UNITED STATES PATENTS

| | | |
|---|---|---|
| 2,149,279 | Dalmer et al. | Mar. 7, 1939 |
| 2,176,063 | Dalmer et al. | Oct. 17, 1939 |
| 2,383,134 | Lacey et al. | Aug. 21, 1945 |
| 2,688,040 | Adams et al. | Aug. 31, 1954 |
| 2,784,141 | Jacobsen | Mar. 5, 1957 |
| 2,804,422 | Schumann | Aug. 27, 1957 |
| 2,923,713 | Fox | Feb. 2, 1960 |
| 2,923,714 | Gardner | Feb. 2, 1960 |

OTHER REFERENCES

Shchukina et al.: Chem. Abstracts, vol. 46, col. 10431–2 (1952). (Abstract of Doklady Akad. Nauk U.S.S.R., vol. 84, 981–4 (1952).

Fox: J. Org. Chem., vol. 20, November 1, pages 60–69 (1955).